(12) United States Patent  
Moriyama et al.

(10) Patent No.: US 9,004,533 B2
(45) Date of Patent: Apr. 14, 2015

(54) STEERING APPARATUS

(71) Applicant: NSK Ltd., Tokyo (JP)

(72) Inventors: Seiichi Moriyama, Maebashi (JP); Kazuhiko Kojima, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/239,824

(22) PCT Filed: Oct. 25, 2012

(86) PCT No.: PCT/JP2012/077587  
§ 371 (c)(1),  
(2) Date: Feb. 20, 2014

(87) PCT Pub. No.: WO2013/094305  
PCT Pub. Date: Jun. 27, 2013

(65) Prior Publication Data  
US 2014/0210196 A1 Jul. 31, 2014

(30) Foreign Application Priority Data

Dec. 20, 2011 (JP) ................................. 2011-277916

(51) Int. Cl.  
B62D 1/184 (2006.01)  
B62D 1/185 (2006.01)  
B62D 1/189 (2006.01)  
B62D 1/19 (2006.01)  
B62D 1/187 (2006.01)

(52) U.S. Cl.  
CPC ............... B62D 1/192 (2013.01); B62D 1/189 (2013.01); B62D 1/187 (2013.01); B62D 1/184 (2013.01)

(58) Field of Classification Search  
CPC ........ B62D 1/184; B62D 1/185; B62D 1/187; B62D 1/189; B62D 1/18  
USPC ..................... 280/775, 777, 779; 74/493, 492  
See application file for complete search history.

(56) References Cited

U.S. PATENT DOCUMENTS 8,186,242 B2 * 5/2012 Uesaka ........................... 74/493  
2006/0028010 A1 * 2/2006 Yamada ........................ 280/775

FOREIGN PATENT DOCUMENTS

JP 4-26173 U 3/1992  
JP 05-262238 A 10/1993

(Continued)

OTHER PUBLICATIONS

International Search Report for PCT/JP2012/077587 dated Jan. 29, 2013 [PCT/ISA/210].

(Continued)

Primary Examiner — Keith Frisby  
(74) Attorney, Agent, or Firm — Sughrue Mion, PLLC

(57) ABSTRACT

A steering apparatus includes an inner column, an outer column fitted onto the inner column, a vehicle body mounting bracket, a distance bracket fixed to the outer circumference of the outer column and slidably held between left and right side plates of the vehicle body mounting bracket, and a tightening rod. The distance bracket is formed with telescopic slots through which the tightening rod is inserted. The distance bracket includes left and right front tightening portions and left and right rear tightening portions. The axial distance between the pair of left and right front tightening portions and the pair of left and right rear tightening portions is shorter than the axial length of each telescopic slot. The outer column is formed with a pair of left and right through-holes into which the left and right front tightening portions or the left and right rear tightening portions is inserted.

7 Claims, 13 Drawing Sheets

(56) References Cited

FOREIGN PATENT DOCUMENTS

| | | |
|---|---|---|
| JP | 2002-274393 A | 9/2002 |
| JP | 2010-132179 A | 6/2010 |
| JP | 2011-006056 A | 1/2011 |
| WO | 2009/013457 A1 | 1/2009 |

OTHER PUBLICATIONS

Written Opinion for PCT/JP2012/077587 dated Jan. 29, 2013 [PCT/ISA/237].
Communication from the Japanese Patent Office dated Dec. 10, 2013, in a counterpart Japanese application No. 2012-550232.

* cited by examiner

US 9,004,533 B2

STEERING APPARATUS

TECHNICAL FIELD

The present invention relates to a steering apparatus having an outer column and an inner column engaged with each other so as to be relatively slidable in an axial direction.

BACKGROUND ART

There is a steering apparatus in which an outer column and an inner column are engaged with each other so as to be relatively slidable in an axial direction, such that the telescopic position of a steering wheel is adjusted or an impact load during second collision is absorbed. In such a steering apparatus, the outer circumference of the inner column is tightened by the inner circumference of the outer column by shrinking the diameter of the outer column having a slit, thereby clamping the inner column such that the inner column cannot move in the axial direction relative to the outer column in the axial direction (see, e.g., Patent Document 1).

However, in a steering apparatus disclosed in Patent Document 1, one end of a slit is open at an end face of an outer column. Therefore, in accordance with the telescopic position of a steering wheel, a distance between a closed end portion of the other end of the slit and the tightening position of the outer column changes. Accordingly, even when an operating lever is operated with the same force, the tightening force of the outer column tightening an inner column changes depending on the telescopic position of the steering wheel.

In a steering apparatus disclosed in Patent Document 2, an inner column is directly clamped by a distance bracket, such that the tightening force of an outer column tightening the inner column does not change depending on the telescopic position of a steering wheel.

However, in the steering apparatus disclosed in Patent Document 2, two distance brackets are provided, the outer circumference of the outer column is tightened by one distance bracket, and the outer circumference of the inner column is tightened by the other distance bracket. Therefore, only one side of the outer circumference of the inner column is tightened, and thus the tightening force is unbalanced on the left and right. Also, since the two distance brackets are rotatably supported by pins, the structures of the distance brackets are complicated, and the manufacturing cost increases.

In a steering apparatus disclosed in Patent Document 3, an inner column is directly clamped by a pressing piece supported to be slidable at a distance bracket. Since the steering apparatus disclosed in Patent Document 3 tightens only one side of the outer circumference of the inner column by one pressing piece, the balance between the left and right of the tightening force is bad. Also, since the pressing piece which is a component separate from the distance bracket is supported to be slidable at the distance bracket, the structure is complicated and the manufacturing cost increases.

PRIOR ART DOCUMENTS

Patent Documents

Patent Document 1: WO2009/013457 A1
Patent Document 2: JP 2002-274393 A
Patent Document 3: JP 5-262238 A FIG. 8 is a side view of a portion of a steering apparatus 101, a steering apparatus according to a related art, and is configured such that an inner column is directly clamped by a distance bracket. In the following description, a "front side", a "rear side", an "upper side", and a "lower side" are based on the front-rear direction and vertical direction of a vehicle body on which the steering apparatus is mounted. As shown in FIG. 8, inside a hollow and cylindrical outer column 1, an upper steering shaft 41 is pivotably and rotatably supported, and to the rear end portion (the right side in FIG. 8) of the upper steering shaft 41, a steering wheel 103 is attached. Into the front end portion (the left side in FIG. 8) of the outer column 1, an inner column 2 is fitted so as to be slidable in an axial direction. The outer column 1 is attached to a vehicle body 5 by an upper side vehicle body mounting bracket 3 (a vehicle body mounting bracket).

The front end portion of the inner column 2 is attached to the vehicle body 5 by a lower side vehicle body mounting bracket 51. A tilt center shaft 21 is fixed to the front end portion of the inner column 2, and is pivotably supported to be tiltable by the lower side vehicle body mounting bracket 51.

A lower steering shaft 42 is rotatably supported by the inner column 2. The lower steering shaft 42 is spline-fitted to the upper steering shaft 41 such that rotation of the upper steering shaft 41 is transmitted to the lower steering shaft 42.

The front end of the lower steering shaft 42 is connected to an intermediate shaft through a universal joint, such that rotation of the intermediate shaft can be transmitted to a steering gear, thereby changing the steering angle of vehicle wheels.

Between the inner surfaces of left and right side plates 32A, 32B extending in the vertical direction of the upper side vehicle body mounting bracket 3, a distance bracket 6 is held so to be capable of telescopic movement and tilting movement. The distance bracket 6 has a shape symmetric with respect to a vertical plane passing through the central axis line of the outer column 1, and is integrally formed by bending a rectangular iron plate material in an inverted-U shape. The arc-shaped upper portion of the distance bracket 6 is attached around the outer circumference of the outer column 1, and is fixed to the outer circumference by welding.

At the distance bracket 6, telescopic slots 63A, 63B are formed to be long in the axial direction (the left-right direction of FIG. 8). Into tilting slots 33A, 33B formed at the side plates 32A, 32B, and the telescopic slots 63A, 63B, a round-bar-like tightening rod 34 is inserted from a direction perpendicular to the drawing sheet of FIG. 8. The tilting slots 33A, 33B are formed in arc shapes having the tilt center shaft 21 as their centers.

Both end portions of the distance bracket 6 in the axial direction are bent at a right angle inward in a vehicle width direction, and on the inner surfaces in the vehicle width direction, left and right tightening portions 66A, 66B are formed. In the outer column 1, left and right through-holes 13A, 13B, 14A, 14B are formed to allow the tightening portions 66A, 66B to be inserted. The front tightening portions 66A, 66B are inserted into the front through-holes 14A, 14B, and the rear tightening portions 66A, 66B are inserted into the rear through-holes 13A, 13B, whereby the front and rear tightening portions 66A, 66B directly tighten the outer circumference of the inner column 2.

The distance L2 between the front tightening portions 66A, 66B and the rear tightening portions 66A, 66B in the axial direction is longer than the length L3 of the telescopic slot 63A, 63B in the axial direction.

To an end portion of the tightening rod 34, an operating lever 349 is fixed. By a cam locking mechanism which is operated by the operating lever 349, the distance bracket 6 is tightened through the side plates 32A, 32B, and the tightening portions 66A, 66B tighten the outer circumference of the inner column 2 from the left side and the right side. If a driver collides with the steering wheel 103 during second collision such that a great impact force acts, the upper side vehicle body mounting bracket 3 and the outer column 1 pull out of the vehicle body 5, and are guided to the inner column 2, such that they carry out collapse movement toward the front side of the vehicle body, thereby absorbing impact energy.

During adjustment of the tilt position and the telescopic position, the operating lever 349 is rotated in a reverse direction, whereby the side plates 32A, 32B are separated from each other such that the tightening of the tightening portions 66A, 66B is released. In this way, it is possible to clamp or unclamp the outer column 1 and the distance bracket 6 with respect to the upper side vehicle body mounting bracket 3 at desired tilt position and telescopic position.

After the distance bracket 6 and the inner column 2 are unclamped with respect to the upper side vehicle body mounting bracket 3, the steering wheel 103 is held and the outer column 1 slides in the axial direction with respect to the inner column 2, thereby being adjusted to the desired telescopic position. Also, the steering wheel 103 is held and the distance bracket 6 and the outer column 1 are adjusted to the desired tilt positions with respect to the tilt center shaft 21.

In this steering apparatus 101, it is sometimes required, with the following constraint conditions, to reduce the entire length L1 of the steering apparatus 101, that is, a length between the center of the steering wheel 103 and the center of the universal joint fixed to the lower steering shaft 42. The constraint conditions include (1) do not change the configuration of a steering wheel coupling part P1 should not change, (2) do not change the size of a keylock mounting part P2, (3) ensure a sufficient telescopic stroke S, and (4) ensure a collapse sufficient movement stroke during second collision.

With these constraint conditions, it becomes difficult to reduce the entire length of the steering apparatus, as a drawback may arise such as the distance bracket 6 being incapable of sufficiently clamping the inner column 2 depending on the telescopic position or a sufficient collapse movement stroke during second collision cannot be ensured.

DISCLOSURE OF THE INVENTION

Problem to be Solved by Invention

It is an object of the present invention to provide a steering apparatus which can ensure a collapse movement stroke during second collision even if the entire length of the steering apparatus is reduced, and in which a tightening force does not change depending on the telescopic position of a steering wheel.

Means for Solving the Problem

According to an aspect of the present invention, steering apparatus includes, an inner column, a hollow outer column fitted onto the inner column such that a telescopic position relative to the inner column is adjustable in an axial direction, a vehicle body mounting bracket including left and right side plates and configured to be attachable to a vehicle body, a distance bracket fixed to an outer circumference of the outer column and is held between the left and right side plates of the vehicle body mounting bracket in a slidable manner, and a tightening rod configured to tighten the left and right side plates of the vehicle body mounting bracket onto the distance bracket. The distance bracket is formed with telescopic slots extending in the axial direction and through which the tightening rod is inserted. The distance bracket includes a pair of left and right front tightening portions and a pair of left and right rear tightening portions to tighten an outer circumference of the inner column, the pair of left and right front tightening portions being provided in front of the pair of left and right rear tightening portions in the axial direction. A distance between the pair of left and right front tightening portions and the pair of left and right rear tightening portions in the axial direction is shorter than a length of the telescopic slots in the axial direction. The outer column is formed with a pair of left and right through-holes into which one of the pair of left and right front tightening portions and the pair of left and right rear tightening portions is inserted. When the left and right side plates of the vehicle body mounting bracket is tightened by the tightening rod, the pair of left and right front tightening portions and the pair of left and right rear tightening portions tighten the outer circumference of the inner column directly and clamp the inner column such that the inner column is immovable in the axial direction relative to the outer column.

An axial end face of the outer column may be disposed between the pair of left and right front tightening portions and the pair of left and right rear tightening portions in the axial direction, and the other of the pair of left and right front tightening portions and the pair of left and right rear tightening portions may tighten the outer circumference of the inner column directly and without passing through the through-holes.

An axial center position between the pair of left and right front tightening portions and the pair of left and right rear tightening portions and an axial center position of the telescopic slots may be shifted from one another in the axial direction.

The distance bracket may be integrally formed in a U shape or in an inverted-U shape, and may be attached around the outer circumference of the outer column.

The distance bracket may include a left distance bracket having the left tightening portions and a right distance bracket having the right tightening portions, the left distance bracket and the right distance bracket being formed as separate components, and one end of each of the left distance bracket and the right distance bracket being fixed to the outer circumference of the outer column The pair of left and right front tightening portions and the pair of left and right rear tightening portions may tighten a lower side or an upper side of the outer circumference of the inner column.

A front end portion of one of the inner column and the outer column may be fixed to the vehicle body.

Advantage of the Invention

According to an aspect of the present invention, the distance between the pair of left and right front tightening portions and the pair of left and right rear tightening portions in the axial direction is shorter than the length of the telescopic slot in the axial direction. Also, when the left and right side plates of the vehicle body mounting bracket are tightened by the tightening rod, the pair of left and right front tightening portions and the pair of left and right rear tightening portions tighten the outer circumference of the inner column directly, thereby clamping the inner column such that the inner column is immovable in the axial direction relative to the outer column.

Therefore, it is possible to reduce the axial length of the outer column, and also to lengthen the collapse stroke of the outer column at the time of collision. Further, since the left and right tightening portions of the distance bracket tighten the outer circumference of the inner column directly from the left and the right, the tightening force on the left and right is balanced, and the tightening force of the outer column tightening the inner column does not change depending on the telescopic position of the steering wheel.

EMBODIMENTS OF INVENTION

Hereinafter, embodiments of the present invention will be described in detail with reference to the drawings.

First Embodiment

Figure 1:
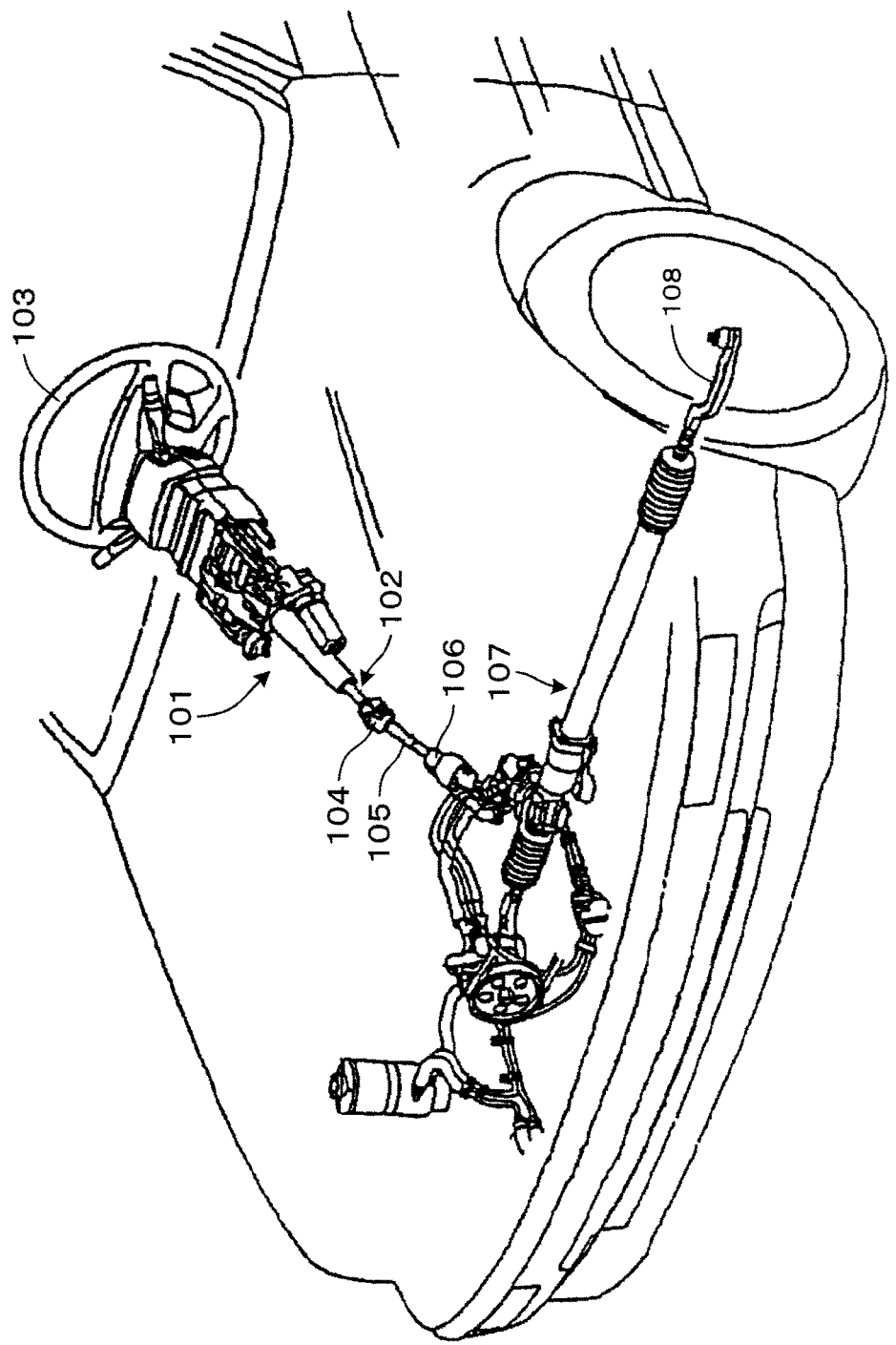
FIG. 1 is a perspective view illustrating a state in which a steering apparatus according to an embodiment of the present invention is attached to a vehicle.
Figure 2:
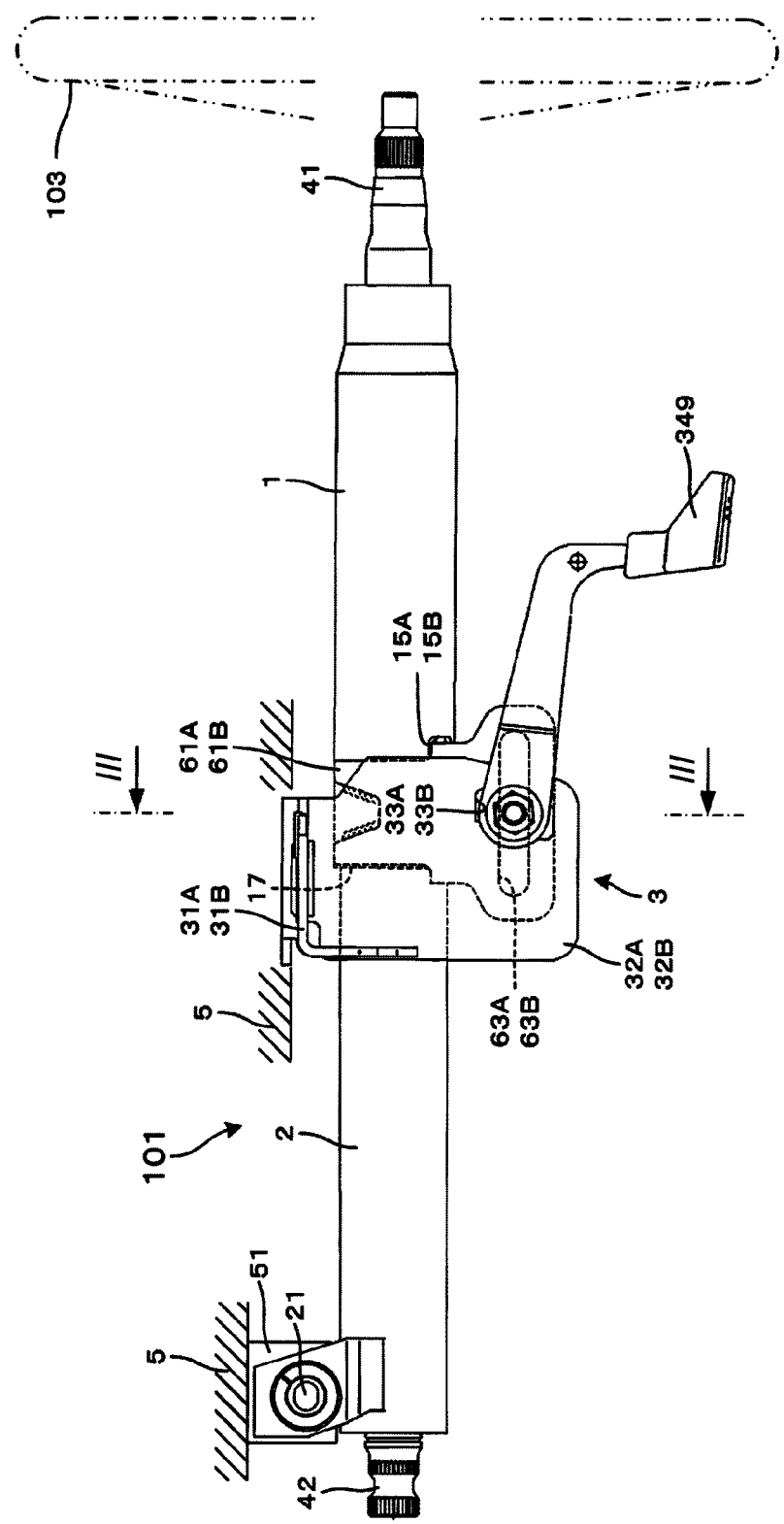
FIG. 2 is a side view of a steering apparatus according to a first embodiment of the present invention.

As shown in FIG. 1, a steering apparatus 101 supports a steering shaft 102 such that the steering shaft is rotatable. The steering shaft 102 includes an upper end portion (rear end portion) to which the steering wheel 103 is attached, and a lower end portion (front end portion) to which an intermediate shaft 105 is connected through a universal joint 104.

The lower end of the intermediate shaft 105 is connected to a universal joint 106, and the universal joint 106 is connected to a steering gear 107 which is composed of a rack-and-pinion mechanism or the like.

If a driver rotates the steering wheel 103, the torque is transmitted to the steering gear 107 through the steering shaft 102, the universal joint 104, the intermediate shaft 105, and the universal joint 106, thereby capable of moving tie rods 108 through the rack-and-pinion mechanism such that the steering angle of vehicle wheels is changed.

Hereinafter, a steering apparatus according to a first embodiment of the present invention will be described with reference to FIGS. 2 to 7C.

As shown in FIGS. 2 to 7C, inside a hollow and cylindrical outer column 1, an upper steering shaft 41 is pivotably and rotatably supported, and to the rear end portion (the right side in FIG. 2) of the upper steering shaft 41, a steering wheel 103 is attached. Into the front end portion (the left side of FIG. 2 or 4) of the outer column 1, an inner column 2 is fitted so as to be slidable in an axial direction. The outer column 1 is attached a vehicle body 5 by an upper side vehicle body mounting bracket 3 (vehicle body mounting bracket).

The front end portion of the inner column 2 is attached to the vehicle body 5 by a lower side vehicle body mounting bracket 51. A tilt center shaft 21 is fixed to the inner column 2 on the front side of the vehicle body, and is pivotably supported by the lower side vehicle body mounting bracket 51 such that the tilt center shaft is tiltable.

A lower steering shaft 42 is pivotably and rotatably supported by the inner column 2, and the lower steering shaft 42 is spline-fitted to the upper steering shaft 41, such that rotation of the upper steering shaft 41 is transmitted to the lower steering shaft 42.

The front end of the lower steering shaft 42 is connected to the intermediate shaft 105 through the universal joint 104, and rotation of the intermediate shaft 105 can be transmitted to a steering gear 107, thereby changing the steering angle of the vehicle wheels (see FIG. 1).

Figure 3:
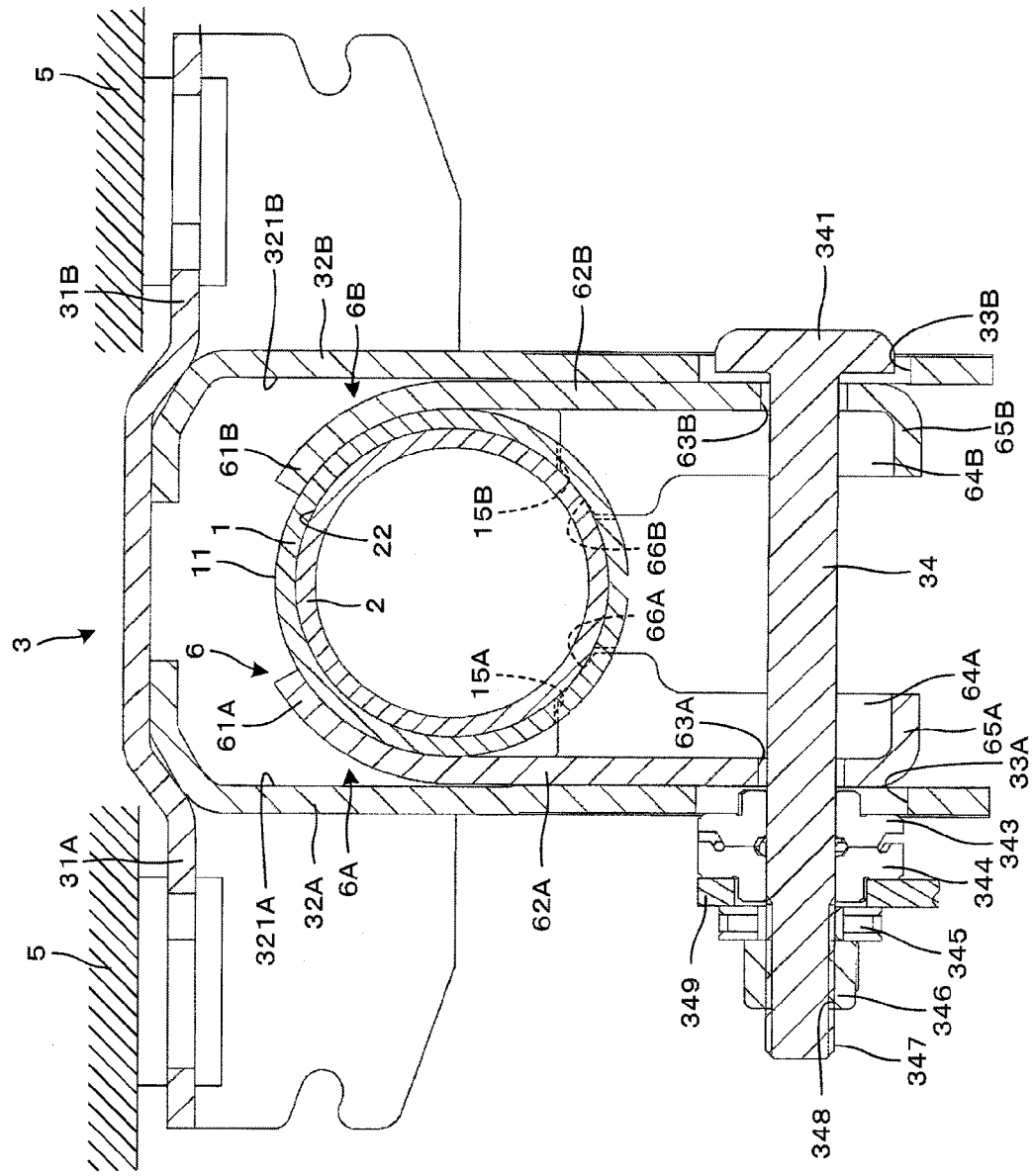
FIG. 3 is a cross-sectional view along the line of FIG. 2.

As shown in FIG. 3, the upper side vehicle body mounting bracket 3 includes left and right side plates 32A, 32B that extend in a vertical direction, and left and right flange portions 31A and 31B that are formed on the side plates 32A, 32B and are for attaching the upper side vehicle body mounting bracket 3 to the vehicle body 5. Between the inner surfaces 321A and 321B of the side plates 32A, 32B, a distance bracket 6 is held so to be capable of telescopic movement and tilting movement. The left and right side plates 32A, 32B are formed integrally with or separately from the flange portions 31A and 31B.

The distance bracket 6 includes a left distance bracket 6A and a right distance bracket 6B. The left distance bracket 6A and the right distance bracket 6B have a shape symmetric with respect to a vertical plane passing through the central axis line of the outer column 1, and are formed by bending rectangular iron plate materials. The arc-shaped upper portions 61A, 61B of the left distance bracket 6A and the right distance bracket 6B are attached around the outer circumference 11 of the outer column 1 and are fixed to the outer circumference 11 by welding.

At the lower sides of the left distance bracket 6A and the right distance bracket 6B, planar portions 62A, 62B are formed to be parallel to the side plates 32A, 32B. Between the inner surfaces 321A and 321B of the left and right side plates 32A, 32B, the planar portions 62A, 62B are held so to be capable of telescopic movement and tilting movement. In the planar portions 62A, 62B, telescopic slots 63A, 63B are formed to be long in the axial direction (a direction perpendicular to the drawing sheet of FIG. 3).

Into tilting slots 33A, 33B formed in the side plates 32A, 32B, and the telescopic slots 63A, 63B, a round-rod-like tightening rod 34 is inserted from the right side of FIG. 3. The tilting slots 33A, 33B are formed in arc shapes having the tilt center shaft 21 as their centers.

At the planar portion 62A of the left distance bracket 6A and the planar portion 62B of the right distance bracket 6B, on both sides of the planar portions 62A, 62B in the front-rear direction, bent portions 64A, 64B are formed. The bent portions 64A, 64B are bent at a right angle inward from the planar portions 62A, 62B in a vehicle width direction. Also, at the lower ends of the planar portions 62A, 62B, bent portions 65A and 65B are formed over the entire lengths of the planar portions 62A, 62B in the front-rear direction.

On the inner surfaces of the bent portions 64A, 64B in the vehicle width direction, left and right tightening portions 66A, 66B are formed in linear shapes. In the outer column 1, only left and right through-holes 15A, 15B for allowing rear tightening portions 66A, 66B to be inserted are formed. The front tightening portions 66A, 66B are positioned on the front side from the front end face 17 of the outer column 1. The through-holes 15A, 15B are formed to be short in the axial direction of the outer column 1, and are formed to be slightly larger than the thicknesses of the rear tightening portions 66A, 66B in the front-rear direction.

The rear tightening portions 66A, 66B are inserted into the through-holes 15A, 15B, such that the rear tightening portions 66A, 66B directly tighten the outer circumference 22 of the inner column 2. Also, the front tightening portions 66A, 66B directly tighten the outer circumference 22 of the inner column 2 without passing through through-holes. The shapes of the tightening portions 66A, 66B are not limited to linear shapes, but may be arc shapes.

Figure 4:
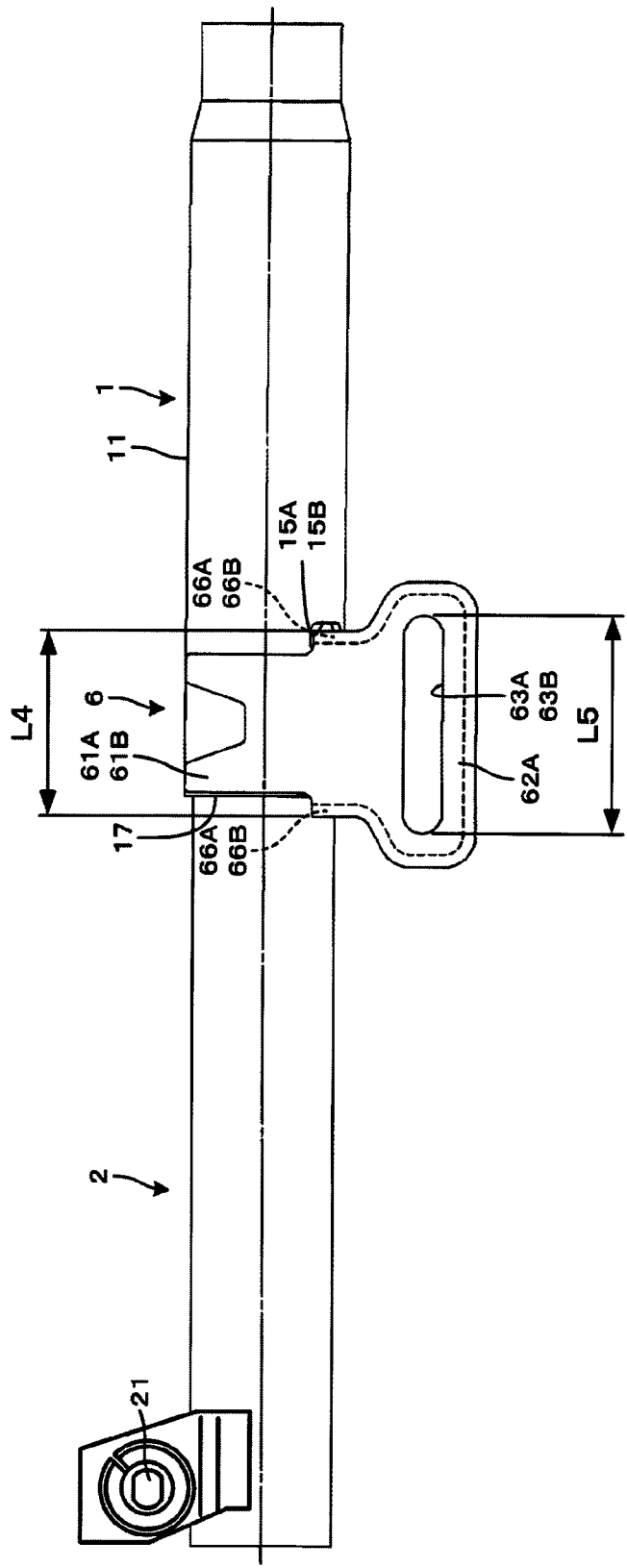
FIG. 4 is a side view of the steering apparatus illustrating a state in which a vehicle body mounting bracket, a steering shaft, and a clamp device have been omitted from the steering apparatus of FIG. 2.
Figure 5:
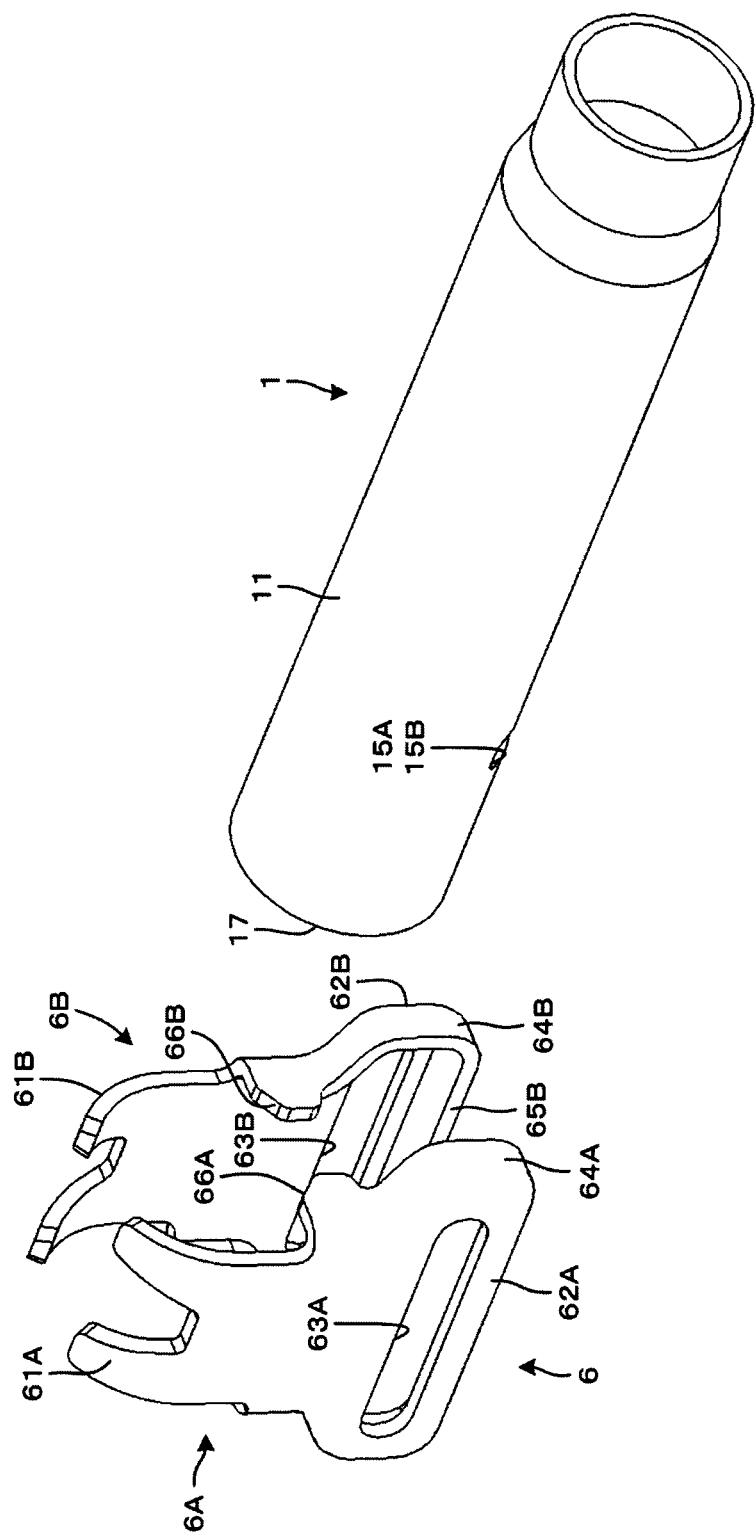
FIG. 5 is an exploded perspective view of the steering apparatus of FIG. 4.
Figure 6:
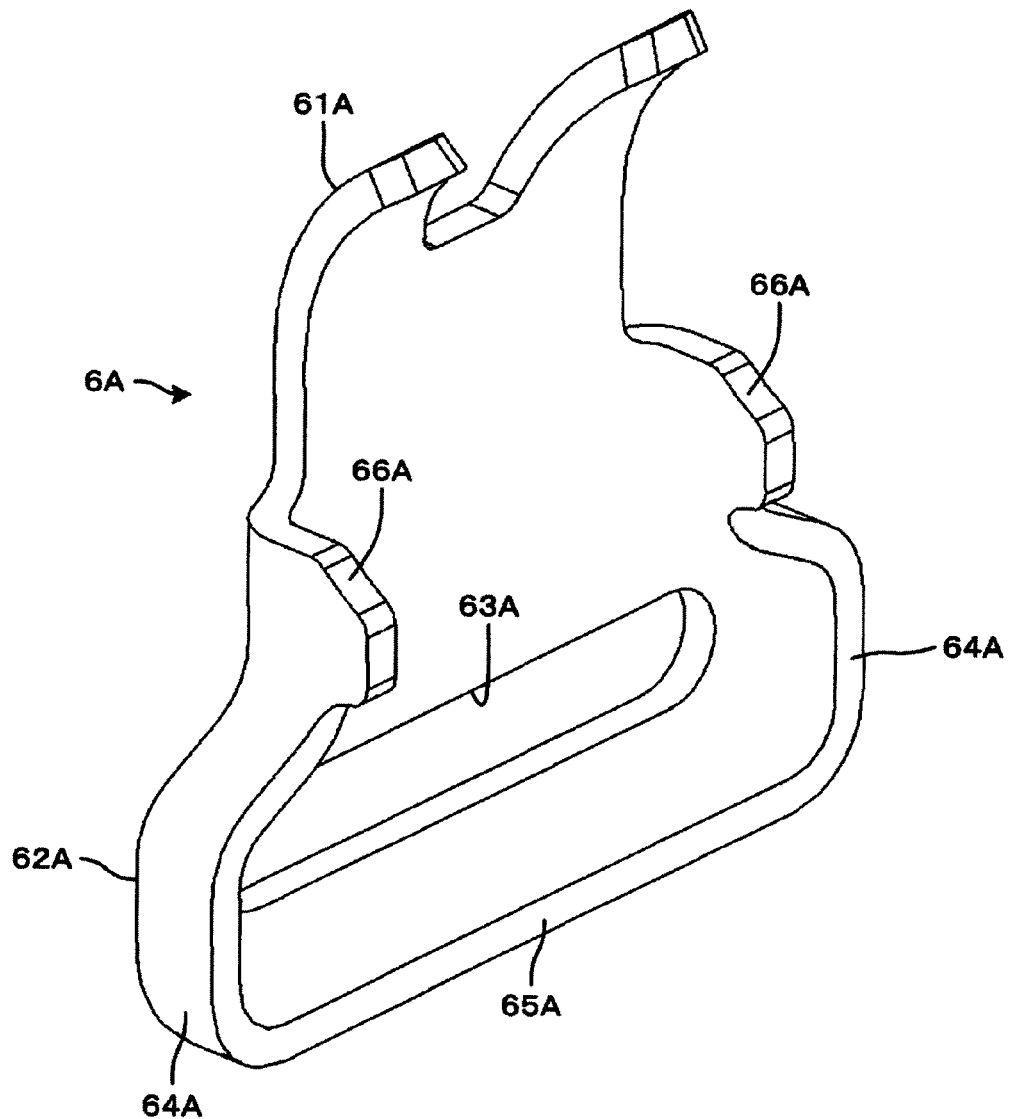
FIG. 6 is a perspective view of a left distance bracket of FIG. 5.
Figure 7A:
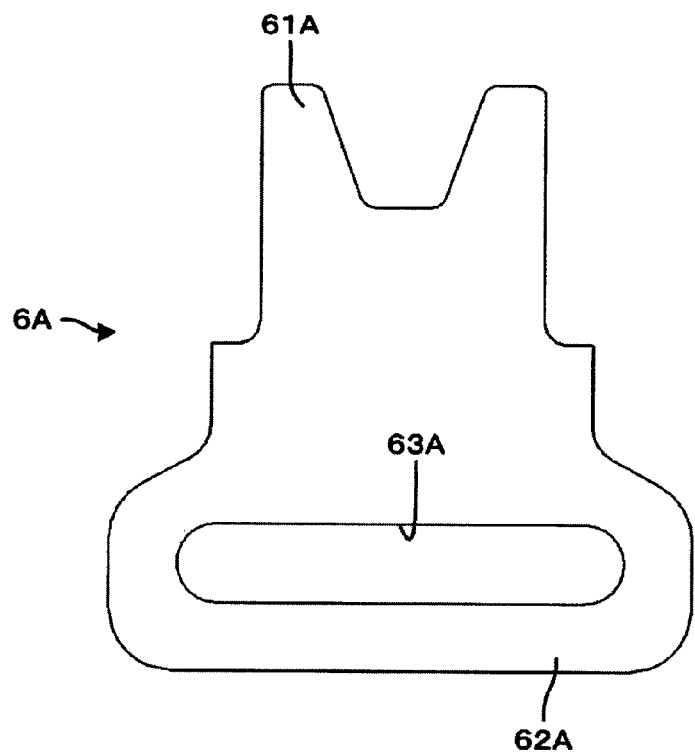
FIG. 7A is a side view of the left distance bracket of FIG. 5.
Figure 7B:
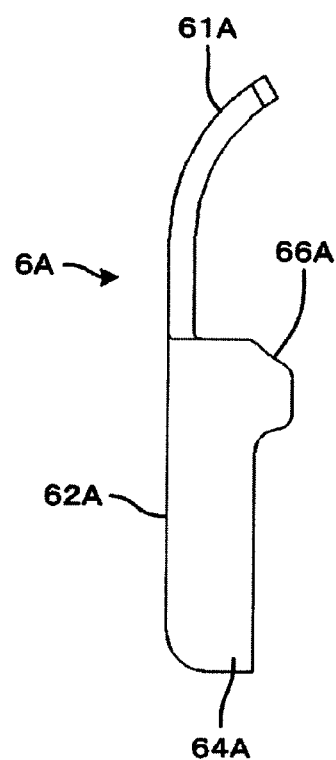
FIG. 7B is a rear view of the left distance bracket of FIG. 5.
Figure 7C:
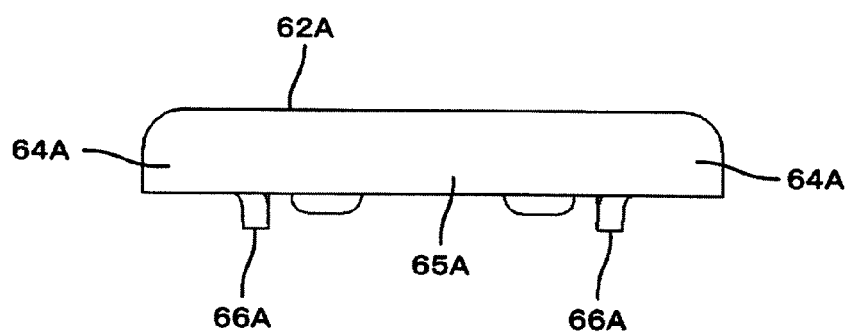
FIG. 7C is a bottom view of the left distance bracket of FIG. 5.
Figure 8:
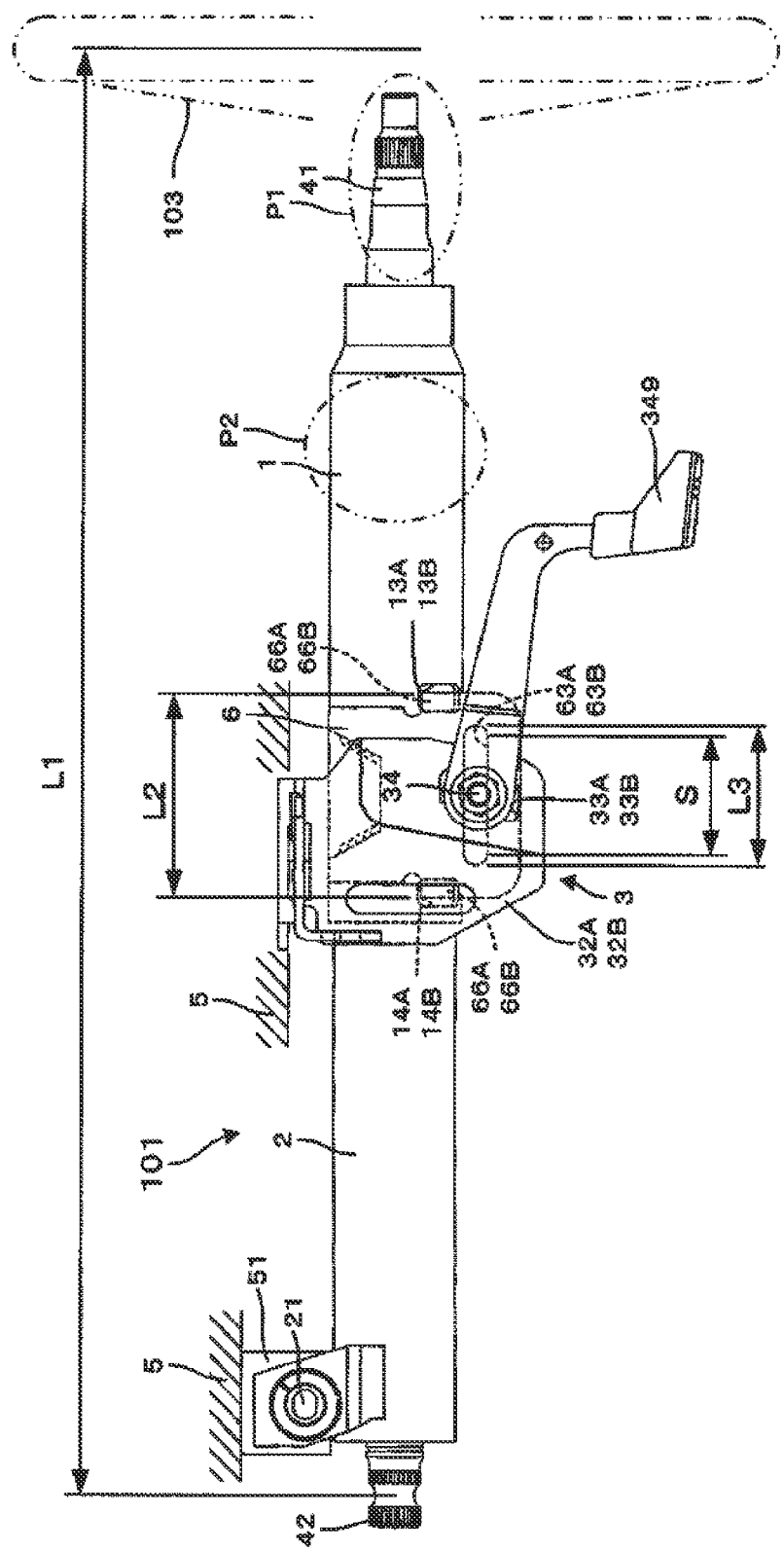
FIG. 8 is a side view of a portion of a steering apparatus of the related art.

As shown in FIG. 4, a distance L4 between the front tightening portions 66A, 66B and the rear tightening portions 66A, 66B in the axial direction is shorter than the length L5 of the telescopic slot 63A, 63B in the axial direction.

As shown in FIG. 3, on the right side of the tightening rod 34, a head portion 341 is formed, and the head portion 341 abuts on the outer surface of the side plate 32B. At the left and outside portion of the head portion 341, a rotation stopping portion (not shown) is formed to have a rectangular section and be slightly narrower than the tilting slot 33B. The rotation stopping portion is fitted into the tilting slot 33B such that the tightening rod 34 is stopped to rotate with respect to the upper side vehicle body mounting bracket 3, and slides the tightening rod 34 along the tilting slot 33B during adjustment of the tilt position.

Onto the outer circumference of the left end of the tightening rod 34, a fixed cam 343, a movable cam 344, a thrust bearing 345, and an adjusting nut 346 are sequentially fitted, and internal thread 348 formed on the inner circumferential portion of the adjusting nut 346 is threaded to external thread 347 formed at the left end of the tightening rod 34. The operating lever 349 is fixed to the left end face of the movable cam 344, and a cam locking mechanism is composed by the movable cam 344 and the fixed cam 343 which are integrally operated by the operating lever 349. The fixed cam 343 is engaged with the tilting slot 33A, such that the fixed cam cannot rotate with respect to the upper side vehicle body mounting bracket 3, and the fixed cam 343 is slid along the tilting slot 33A during adjustment of the tilt position.

During tilt-and-telescopic tightening, when the operating lever 349 is rotated, the crest of the movable cam 344 runs on the crest of the fixed cam 343 such that the tightening rod 34 is drawn toward the left side while the fixed cam 343 is pressed toward the right side of FIG. 3, whereby the side plates 32A, 32B is tightened. The inner surfaces 321A and 321B of the side plates 32A, 32B tighten the planar portions 62A, 62B of the distance bracket 6. The planar portions 62A, 62B are elastically deformed inward in the vehicle width direction, and the tightening portions 66A, 66B of the bent portions 64A, 64B tighten the outer circumference 22 of the inner column 2 from the left and the right.

During tilt-and-telescopic releasing, the operating lever 349 is rotated in a reverse direction, and the trough of the movable cam 344 comes into the crest of the fixed cam 343, whereby the force pressing the fixed cam 343 toward the right side is released. At the same time, the force drawing the tightening rod 34 toward the left side is released such that the side plates 32A, 32B are separated from each other, whereby the elastic deformation of the planar portions 62A, 62B is released and the tightening of the tightening portions 66A, 66B is released. In this way, it is possible to clamp or unclamp the outer column 1 and the distance bracket 6 with respect to the upper side vehicle body mounting bracket 3 at desired tilt position and telescopic position.

After the distance bracket 6 and the inner column 2 are unclamped with respect to the upper side vehicle body mounting bracket 3, the steering wheel 103 is held and the outer column 1 slides with respect to the inner column 2 in the axial direction, thereby being adjusted to the desired telescopic position. At this time, the distance bracket 6 is guided to the tightening rod 34, and slides in the axial direction together with the outer column 1.

Also, the steering wheel 103 is held and the distance bracket 6 and the outer column 1 are adjusted to the desired tilt positions with respect to the tilt center shaft 21. Then, the distance bracket 6 and the inner column 2 are clamped with respect to the upper side vehicle body mounting bracket 3.

According to the first embodiment, the distance L4 between the front tightening portions 66A, 66B and the rear tightening portions 66A, 66B in the axial direction is shorter than the length L5 of the telescopic slot 63A, 63B in the axial direction. Also, the through-holes 15A, 15B are formed at one place in the axial direction. Therefore, it is possible to reduce the length of the outer column in the axial direction, and it is possible to lengthen the collapse stroke of the outer column during collision. Also, since the through-holes 15A, 15B are formed to be short in the axial direction of the outer column 1, the area of the openings of the through-holes are suppressed to be small, the rigidity of the outer column 1 is high, and it is possible to improve the steering feeling of the steering apparatus.

Also, the left and right tightening portions 66A, 66B of the distance bracket 6 directly tighten the outer circumference 22 of the inner column 2 from the left and the right. Therefore, the tightening force on the left and right is balanced, and the tightening force of the outer column 1 tightening the inner column 2 does not change depending on the telescopic position of the steering wheel 103.

Second Embodiment

Figure 9:
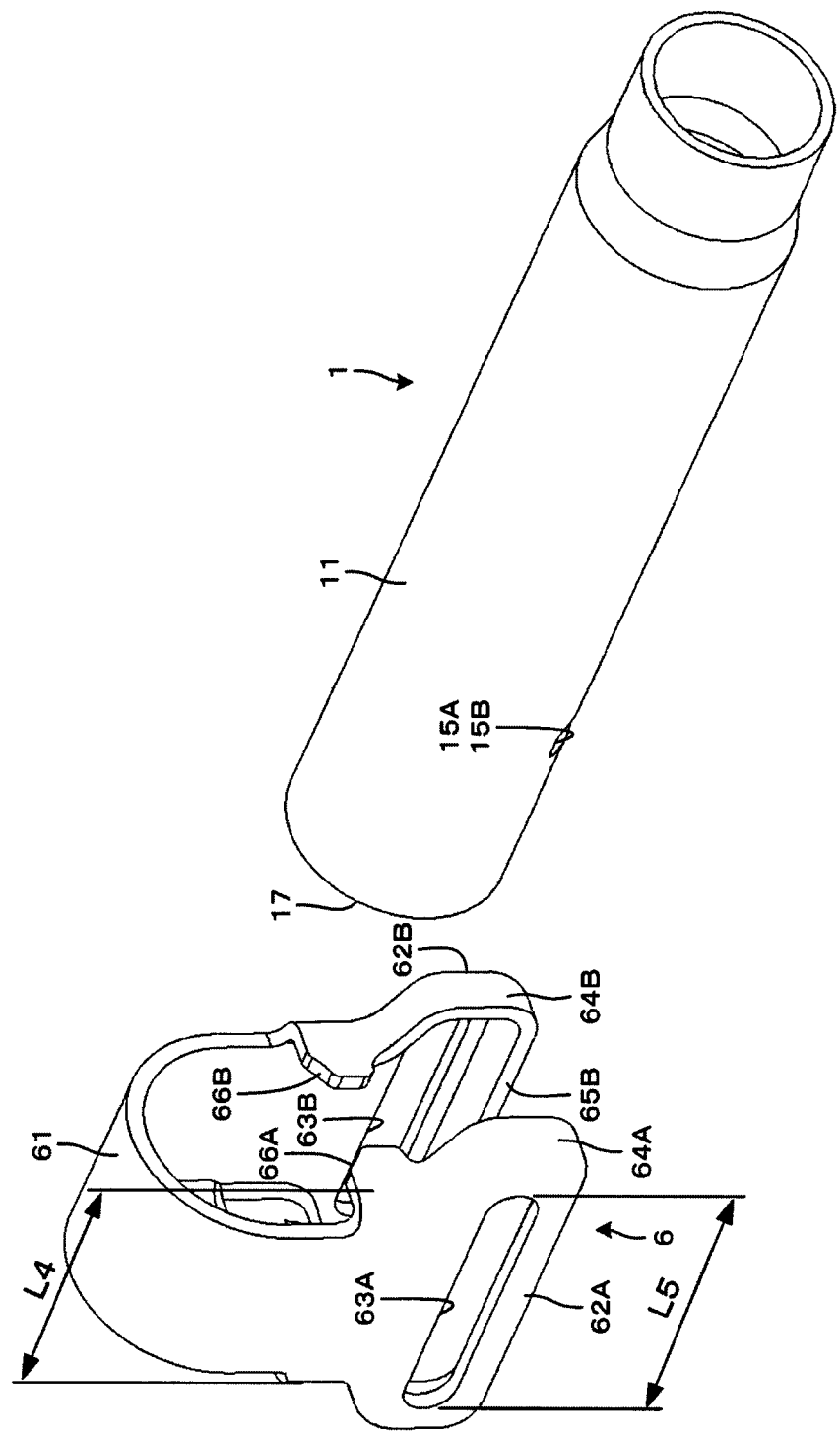
FIG. 9 is an exploded perspective view of a steering apparatus according to a second embodiment of the present invention.

Next, a second embodiment of the present invention will be described with reference to FIG. 9. In the following description, structure portions different from the first embodiment will be described, and the same structure portions as those of the first embodiment will not be described.

In the first embodiment, the left and right tightening portions of the distance bracket 6 are formed as separate components; whereas, the second embodiment is an example in which the distance bracket 6 is integrally formed. In other words, as shown in FIG. 9, the distance bracket 6 of the second embodiment has a shape symmetric with respect to a vertical plane passing through the central axis line of the outer column 1, and is integrally formed by bending a rectangular iron plate material in an inverted-U shape. An arc-shaped upper portion 61 of the distance bracket 6 is attached around the outer circumference 11 of the outer column 1, and is fixed to the outer circumference 11 by welding. The arc-shaped portion 61 of the distance bracket 6 may be fixed to the outer circumference 11 of the outer column 1 by caulking, bolts, pins, rivets, or the like.

At both ends of the lower side of the distance bracket 6, the planar portions 62A, 62B are formed to be parallel to the side plates 32A, 32B, and between the inner surfaces 321A and 321B of the left and right side plates 32A, 32B, the planar portions 62A, 62B are held so to be capable of telescopic movement and tilting movement. In the planar portions 62A, 62B, the telescopic slots 63A, 63B are formed to be long in the axial direction.

In the planar portions 62A, 62B of the distance bracket 6, on both sides of the planar portions 62A, 62B in the front-rear direction, the bent portions 64A, 64B are formed. Also, on the lower sides of the planar portions 62A, 62B, the bent portions 65A and 65B are formed over the entire lengths of the planar portions 62A, 62B in the front-rear direction. On the inner surfaces of the bent portions 64A, 64B in the vehicle width direction, the tightening portions 66A, 66B are formed in linear shapes.

In the outer column 1, only through-holes 15A, 15B for allowing rear tightening portions 66A, 66B to be inserted are formed. The front tightening portions 66A, 66B are placed on the front side from the front end face 17 of the outer column 1. The through-holes 15A, 15B are formed to be short in the axial direction of the outer column 1, and are formed to be slightly larger than the thicknesses of the rear tightening portions 66A, 66B in the front-rear direction.

The rear tightening portions 66A, 66B are inserted into the through-holes 15A, 15B, such that the rear tightening portions 66A, 66B directly tighten the outer circumference 22 of the inner column 2. Also, the front tightening portions 66A, 66B directly tighten the outer circumference 22 of the inner column 2 without passing through through-holes.

In the second embodiment, similarly to the first embodiment, the distance L4 between the front tightening portions 66A, 66B and the rear tightening portions 66A, 66B in the axial direction is shorter than the length L5 of the telescopic slot 63A, 63B in the axial direction.

According to the second embodiment, since the distance bracket 6 is integrally formed, one end of the distance bracket 6 is fixed to the outer circumference of the outer column 1, and the tightening portions 66A, 66B are formed to tighten the outer circumference of the inner column 2, the structure of the distance bracket 6 is simple, and it is possible to reduce the manufacturing cost.

Third Embodiment

Figure 10:
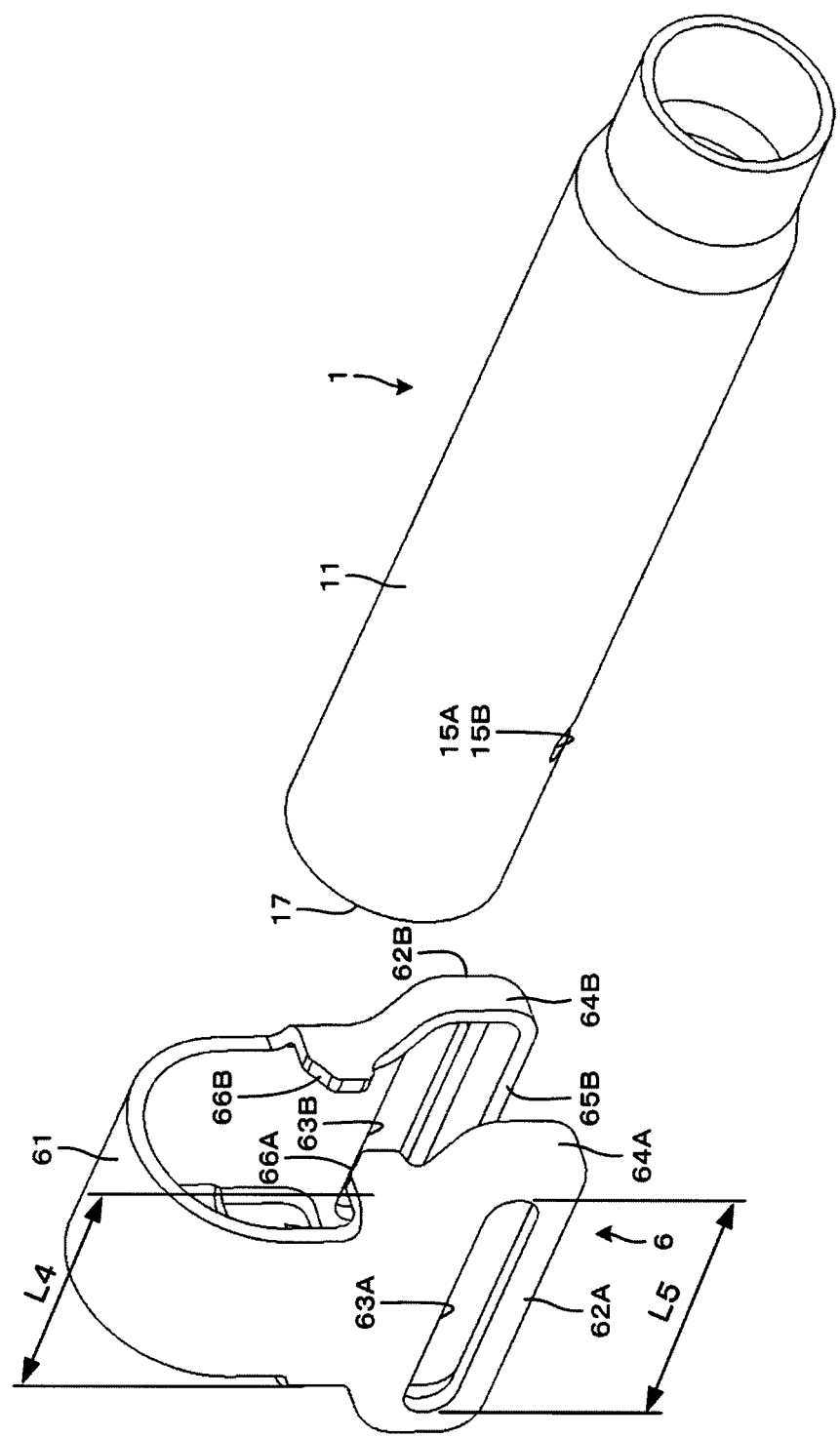
FIG. 10 is an exploded perspective view of a steering apparatus according to a third embodiment of the present invention.

Next, a third embodiment of the present invention will be described with reference to FIGS. 10 and 11. In the following description, structure portions different from the first embodiment will be described, and the same structure portions as those of the first embodiment will not be described.

The third embodiment is an example in which the axial positions of the tightening portions 66A, 66B and the axial positions of the telescopic slots 63A, 63B are deviated. In other words, as shown in FIGS. 10 and 11, a distance bracket 6 of the third embodiment includes a left distance bracket 6A and a right distance bracket 6B, similarly to the first embodiment. The arc-shaped upper portions 61A, 61B of the left distance bracket 6A and the right distance bracket 6B are attached around the outer circumference 11 of the outer column 1 and are fixed to the outer circumference 11 by welding. At the planar portion 62A of the left distance bracket 6A and the planar portion 62B of the right distance bracket 6B, tightening portions 66A, 66B are formed in linear shapes.

In the planar portions 62A, 62B, telescopic slots 63A, 63B are formed to be long in the axial direction. In the outer column 1, only through-holes 15A, 15B for allowing the rear tightening portions 66A, 66B to be inserted are formed. The front tightening portions 66A, 66B are placed on the front side from the front end face 17 of the outer column 1.

The rear tightening portions 66A, 66B are inserted into the through-holes 15A, 15B, such that the rear tightening portions 66A, 66B directly tighten the outer circumference 22 of the inner column 2. Also, the front tightening portions 66A, 66B directly tighten the outer circumference 22 of the inner column 2 without passing through through-holes.

Figure 11:
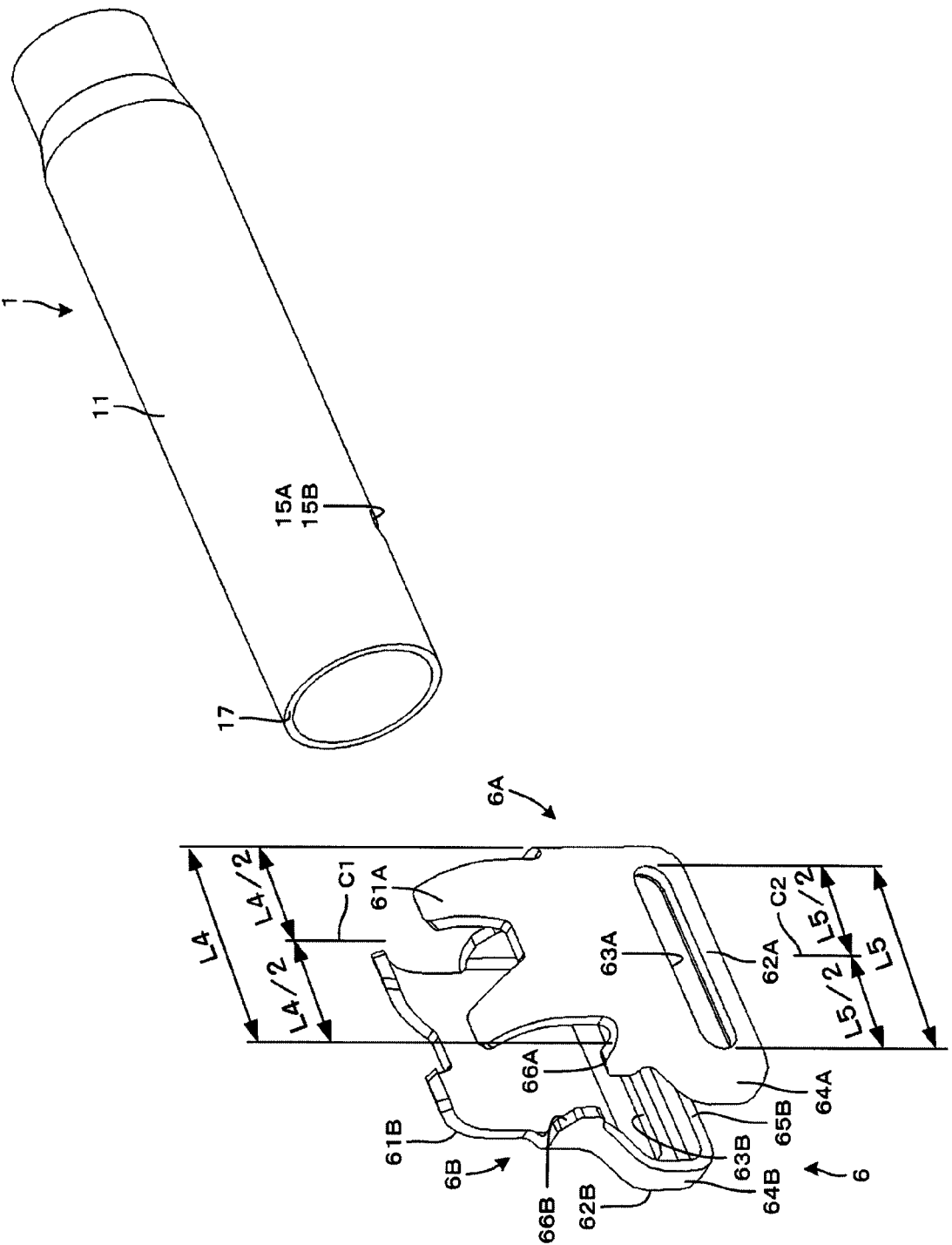
FIG. 11 is an exploded perspective view of the steering apparatus according to the third embodiment of the present invention, and is an exploded perspective view as seen from the obliquely upper side of the front side of a vehicle body.

As shown in FIG. 11, in the third embodiment, similarly to the first embodiment, the distance L4 between the front tightening portions 66A, 66B and the rear tightening portions 66A, 66B in the axial direction is shorter than the length L5 of the telescopic slot 63A, 63B in the axial direction. Further, the axial center position C2 along the axial length L5 is shifted forward in the axial direction from the axial center position C1 along the axial length L4.

According to the third embodiment, since the axial positions of the telescopic slots 63A, 63B are deviated toward the front side from the axial positions of the tightening portions 66A, 66B, according to the amount of deviation in the axial direction the fitting length of the inner column 2 into the outer column 1 lengthens, and the rigidity of the steering apparatus becomes high.

Fourth Embodiment

Next, a fourth embodiment of the present invention will be described with reference to FIG. 12. In the following description, structure portions different from the first embodiment will be described, and the same structure portions as those of the first embodiment will not be described.

The fourth embodiment is an example in which the front end portion of the outer column 1 is attached to the vehicle body, and the inner column 2 is disposed on the rear side of the outer column 1. In other words, as shown in FIG. 12, the front end portion (the left side in FIG. 12) of the outer column 1 is attached to the vehicle body 5 by the lower side vehicle body mounting bracket 51. A tilt center shaft 111 is fixed to the front end portion of the outer column 1, and is pivotably supported by the lower side vehicle body mounting bracket 51 such that the tilt center shaft is tiltable. Also, a neck end portion (the right side in FIG. 12) of the outer column 1 is attached to the vehicle body by an upper side vehicle body mounting bracket (vehicle body mounting bracket).

Inside the hollow and cylindrical outer column 1, the lower steering shaft is pivotably and rotatably supported, and the left end of the lower steering shaft is connected to an intermediate shaft 105 through the universal joint 104 of FIG. 1, and the lower end of the intermediate shaft 105 is transmitted to the steering gear 107, whereby the steering angle of the vehicle wheels can be changed.

Into the outer column 1 on the rear surface of the vehicle body (the right side of FIG. 12), the inner column 2 is fitted so as to be slidable in the axial direction. The upper steering shaft is pivotably and rotatably supported by the inner column 2, and the upper steering shaft is spline-fitted to the lower steering shaft, such that rotation of the upper steering shaft can be transmitted to the lower steering shaft. To the rear end portion of the upper steering shaft, the steering wheel 103 is attached.

Between the inner surfaces of the left and right side plates of the upper side vehicle body mounting bracket, the distance bracket 6 is held so to be capable of tilting movement. The distance bracket 6 of the fourth embodiment includes a left distance bracket 6A and a right distance bracket 6B, similarly to the first embodiment. The arc-shaped upper portions 61A, 61B of the left distance bracket 6A and the right distance bracket 6B are attached around the outer circumference 11 of the outer column 1 and are fixed to the outer circumference 11 by welding. At the planar portion 62A of the left distance bracket 6A and the planar portion 62B of the right distance bracket 6B, tightening portions 66A, 66B are formed in linear shapes.

In the outer column 1, only through-holes 16A and 16B for allowing the front tightening portions 66A, 66B to be inserted are formed. The rear tightening portions 66A, 66B are placed on the rear side from the rear end face 18 of the outer column 1. The front tightening portions 66A, 66B are inserted into the through-holes 16A and 16B, such that the rear tightening portions 66A, 66B directly tighten the outer circumference 22 of the inner column 2. Also, the rear tightening portions 66A, 66B directly tighten the outer circumference 22 of the inner column 2 without passing through through-holes.

Figure 12:
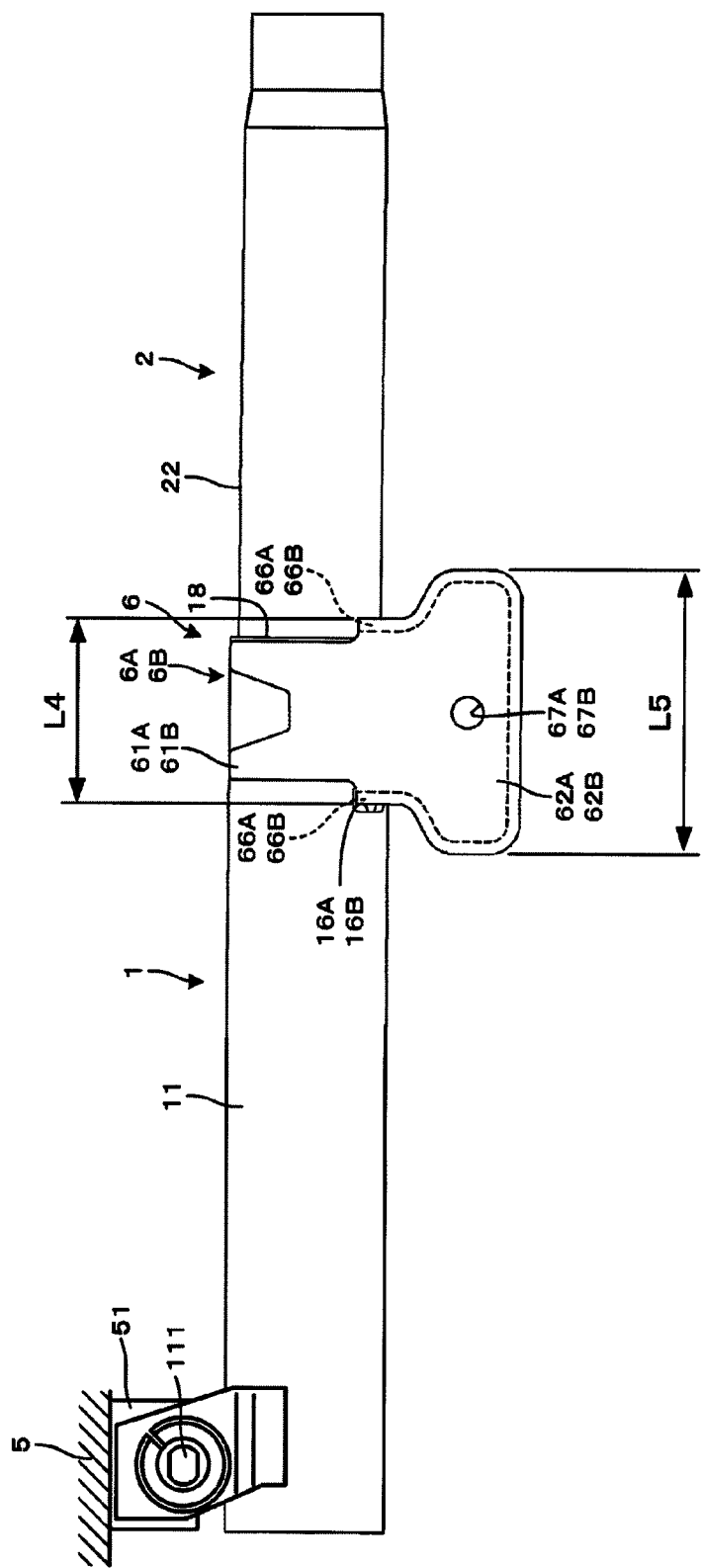
FIG. 12 is a side view illustrating a steering apparatus according to a fourth embodiment of the present invention.

In the planar portions 62A, 62B, round holes 67A and 67B are formed in a direction perpendicular to the drawing sheet of FIG. 12, and a round-rod-like tightening rod is inserted from the direction perpendicular to the drawing sheet of FIG. 12 into the tilting slots formed at the left and right side plates of the upper side vehicle body mounting bracket and the round holes 67A and 67B. In the fourth embodiment, the distance L4 between the front tightening portions 66A, 66B and the rear tightening portions 66A, 66B in the axial direction is shorter than the length L5 of the telescopic slot 63A, 63B in the axial direction (the axial length of the planar portion 62A, 62B at the vertical position where the round hole 67A, 67B is formed).

During tilt-and-telescopic tightening, when the operating lever is rotated, the left and right side plates are tightened, and the distance bracket 6 is tightened, whereby the left and right tightening portions 66A, 66B of the distance bracket 6 tighten the outer circumference 22 of the inner column 2.

During tilt-and-telescopic releasing, the operating lever is rotated in a reverse direction, and the tightening of the distance bracket 6 is released. In this way, it is possible to clamp or unclamp the distance bracket 6 and the inner column 2 with respect to the upper side vehicle body mounting bracket 3 at desired tilt position and telescopic position.

After the distance bracket 6 is unclamped with respect to the upper side vehicle body mounting bracket 3, the steering wheel 103 is held and the inner column 2 slides with respect to the outer column 1 in the axial direction, thereby being adjusted to a desired telescopic position. At this time, the distance bracket 6 and the outer column 1 are held at the fixed positions.

Also, the steering wheel 103 is held, and the inner column 2, the outer column 1, and the distance bracket 6 are adjusted to the desired tilt positions with respect to the tilt center shaft 111. Then, the distance bracket 6 is clamped to the upper side vehicle body mounting bracket.

According to the fourth embodiment, since the telescopic slots 63A, 63B are not formed at the distance bracket 6, the structure of the distance bracket 6 is simple, the rigidity becomes high, and it is possible to reduce the manufacturing cost.

Fifth Embodiment

Next, a fifth embodiment of the present invention will be described with reference to FIG. 13. In the following description, structure portions different from the first embodiment will be described, and the same structure portions as those of the first embodiment will not be described.

The fifth embodiment is an example in which the tightening rod 34 and the tightening portions of the distance bracket 6 are disposed on the upper side of the outer column 1. In other words, as shown in FIG. 13, the distance bracket 6 of the fifth embodiment includes a left distance bracket 6A and a right distance bracket 6B, similarly to the first embodiment. The arc-shaped lower portions 61A, 61B of the left distance bracket 6A and the right distance bracket 6B are attached around the outer circumference 11 of the outer column 1 and are fixed to the outer circumference 11 by welding.

At both ends of the upper side of the distance bracket 6, the planar portions 62A, 62B are formed to be parallel to the side plates 32A, 32B. Between the inner surfaces 321A and 321B of the left and right side plates 32A, 32B, the planar portions 62A, 62B are held so to be capable of telescopic movement and tilting movement. In the planar portions 62A, 62B, telescopic slots 63A, 63B are formed to be long in the axial direction (a direction perpendicular to the drawing sheet of FIG. 13). Into tilting slots 33A, 33B formed in the side plates 32A, 32B, and the telescopic slots 63A, 63B, the round-rod-like tightening rod 34 is inserted from the right side of FIG. 13, and the tightening rod 34 is disposed on the upper side of the outer column 1.

In the planar portions 62A, 62B, on both sides of the planar portions 62A, 62B in the front-rear direction, bent portions 64A, 64B are formed. The bent portions 64A, 64B are bent at a right angle from the planar portions 62A, 62B inward in the vehicle width direction. On the inner surfaces of the bent portions 64A, 64B in the vehicle width direction, tightening portions 66A, 66B are formed in linear shapes.

In the outer column 1 similarly to the first embodiment, only through-holes 15A, 15B for allowing rear tightening portions 66A, 66B to be inserted are formed. The front tightening portions 66A, 66B are placed on the front side from the front end face of the outer column 1.

The rear tightening portions 66A, 66B are inserted into the through-holes 15A, 15B, such that the rear tightening portions 66A, 66B directly tighten the outer circumference 22 of the inner column 2. Also, the front tightening portions 66A, 66B directly tighten the outer circumference 22 of the inner column 2 without passing through through-holes.

On the right side of the tightening rod 34, a head portion 341 is formed, and the head portion 341 abuts on the outer surface of the side plate 32B. Onto the outer circumference of the left end of the tightening rod 34, a fixed cam 343, a movable cam 344, a thrust bearing 345, and an adjusting nut 346 are sequentially fitted, and internal thread 348 formed on the inner circumferential portion of the adjusting nut 346 is threaded to external thread 347 formed at the left end of the tightening rod 34.

The operating lever 349 is fixed to the left end face of the movable cam 344, and a cam locking mechanism is composed by the movable cam 344 and the fixed cam 343 which are integrally operated by the operating lever 349. The fixed cam 343 is engaged with the tilting slot 33A, such that the fixed cam cannot rotate with respect to the upper side vehicle body mounting bracket 3, and slides the fixed cam 343 along the tilting slot 33A during adjustment of the tilt position.

Figure 13:
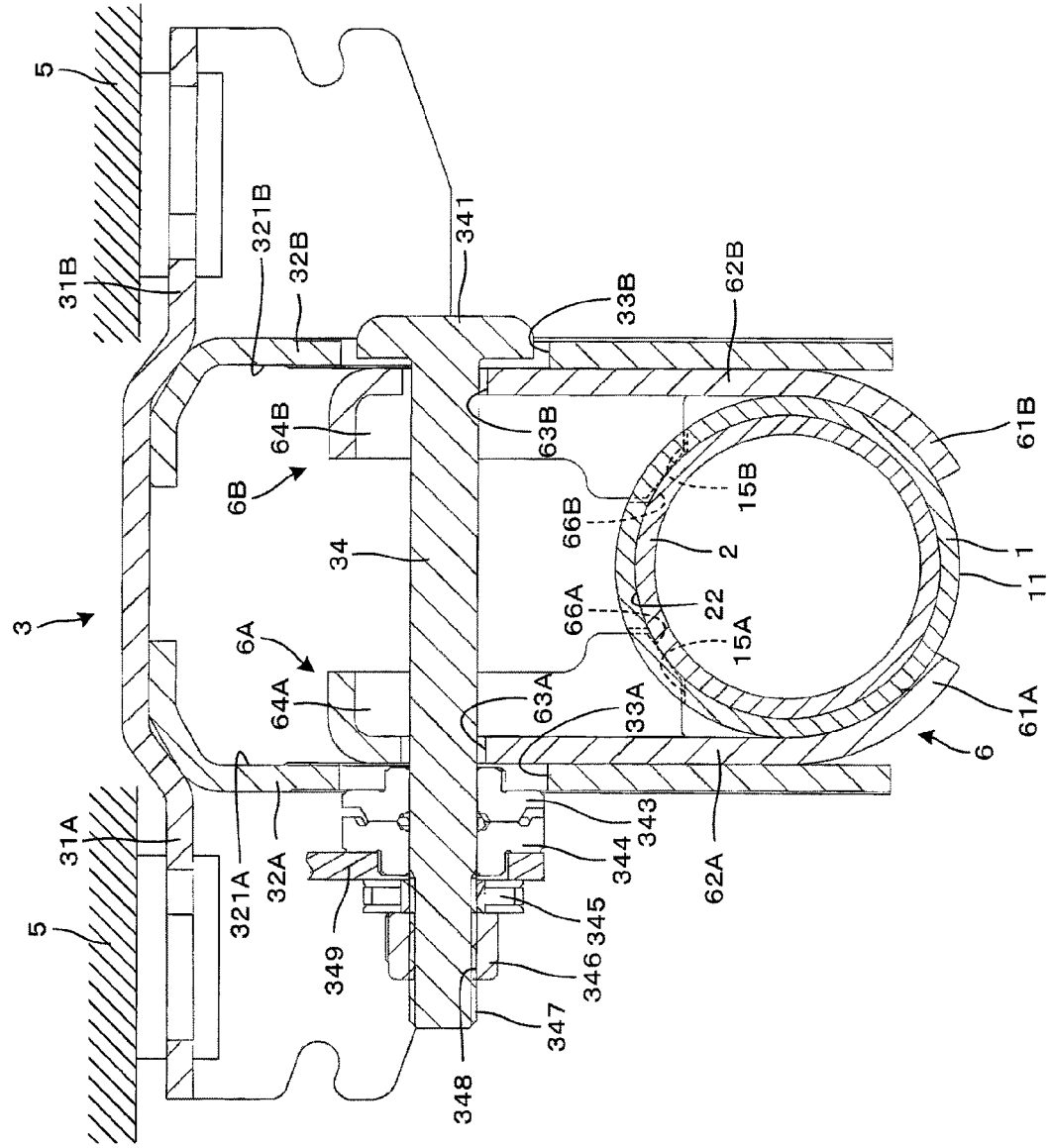
FIG. 13 is a cross-sectional view illustrating a steering apparatus according to a fifth embodiment of the present invention.

During tilt-and-telescopic tightening, if the operating lever 349 is rotated, the crest of the movable cam 344 runs on the crest of the fixed cam 343 such that the tightening rod 34 is drawn toward the left side while the fixed cam 343 is pressed toward the right side of FIG. 13, whereby the side plates 32A, 32B are tightened. The inner surfaces 321A and 321B of the side plates 32A, 32B tighten the planar portions 62A, 62B of the distance bracket 6. The planar portions 62A, 62B are elastically deformed inward in the vehicle width direction, and the tightening portions 66A, 66B of the bent portions 64A, 64B tighten the outer circumference 22 of the inner column 2 from the left and the right.

In this way, it is possible to clamp or unclamp the outer column 1 and the distance bracket 6 with respect to the upper side vehicle body mounting bracket 3 at desired tilt position and telescopic position. Although not shown, in the fifth embodiment, similarly to the first embodiment, the distance between the front tightening portions 66A, 66B and the rear tightening portions 66A, 66B in the axial direction is shorter than the length of the telescopic slot 63A, 63B in the axial direction.

In the above-described embodiments, the inner column 2 is tightened by the front tightening portions 66A, 66B and the rear tightening portions 66A, 66B, that is, two pairs of tightening portions 66A, 66B. However, three or more pairs of tightening portions 66A, 66B may be formed at the distance bracket 6. For example, intermediate tightening portions 66A, 66B may be provided between the front tightening portions 66A, 66B and the rear tightening portions 66A, 66B, and through-holes 15A, 15B may be additionally formed at portions of the outer column 1 corresponding to the intermediate tightening portions 66A, 66B. In this case, the intermediate tightening portions 66A, 66B are inserted into corresponding through-holes 15A, 15B, and directly tighten the outer circumference 22 of the inner column 2 together with the front tightening portions 66A, 66B and the rear tightening portions 66A, 66B. According to this configuration, the tightening force is further improved. Also, in the above-described embodiments, the distance bracket and the outer column are fixed by welding. However, the distance bracket and the outer column may be fixed by bolting, pining, or caulking. Also, in the above-described embodiments, the outer column and the inner column are formed in cylindrical shapes. However, the outer circumference and the inner column may not be cylindrical, and according to the outer circumferential shape of the inner column the shapes of the tightening portions may be changed.

In the above-described embodiments, a case of applying the present invention to a tiltable and telescopic steering apparatus capable of both of adjustment of a tilt position and adjustment of a telescopic position has been described. However, the present invention can be applied to a steering apparatus capable of adjustment of only a telescopic position.

This application is based on Japanese Patent Application No. 2011-277916 filed on Nov. 20, 2011, the content of which is incorporated herein by reference.

INDUSTRIAL APPLICABILITY

The present invention is applicable to a steering apparatus having an outer column and an inner column engaged with each other so as to be relatively slidable in an axial direction.

DESCRIPTION OF REFERENCE NUMERALS AND SIGNS

101 Steering Apparatus
1 Outer Column
11 Outer Circumference
15A, 15B Through-Hole
16A, 16B Through-Hole
17 Front End Face
18 Rear End Face
2 Inner Column
22 Outer Circumference
3 Upper Side Vehicle Body Mounting Bracket (Vehicle Body Mounting Bracket)
32A, 32B Side Plate
33A, 33B Tilting Slot
34 Tightening Rod
5 Vehicle Body
6 Distance Bracket
6A Left Distance Bracket
6B Right Distance Bracket
61 Arc-Shaped Portion
61A, 61B Arc-Shaped Portion
63A, 63B Telescopic Slot
66A, 66B Tightening Portion

The invention claimed is:

1. A steering apparatus comprising:
an inner column;
a hollow outer column fitted onto the inner column such that a telescopic position relative to the inner column is adjustable in an axial direction;
a vehicle body mounting bracket including left and right side plates and configured to be attachable to a vehicle body;
a distance bracket fixed to an outer circumference of the outer column and is held between the left and right side plates of the vehicle body mounting bracket in a slidable manner; and
a tightening rod configured to tighten the left and right side plates of the vehicle body mounting bracket onto the distance bracket,
wherein the distance bracket is formed with telescopic slots extending in the axial direction and through which the tightening rod is inserted,
wherein the distance bracket includes a pair of left and right front tightening portions and a pair of left and right rear tightening portions to tighten an outer circumference of the inner column, the pair of left and right front tightening portions being provided in front of the pair of left and right rear tightening portions in the axial direction,
wherein a distance between the pair of left and right front tightening portions and the pair of left and right rear tightening portions in the axial direction is shorter than a length of the telescopic slots in the axial direction,
wherein the outer column is formed with a pair of left and right through-holes into which one of the pair of left and right front tightening portions and the pair of left and right rear tightening portions is inserted, and
wherein, when the left and right side plates of the vehicle body mounting bracket is tightened by the tightening rod, the pair of left and right front tightening portions and the pair of left and right rear tightening portions tighten the outer circumference of the inner column directly and clamp the inner column such that the inner column is immovable in the axial direction relative to the outer column.

2. The steering apparatus according to claim 1, wherein an axial end face of the outer column is disposed between the pair of left and right front tightening portions and the pair of left and right rear tightening portions in the axial direction, and
wherein the other of the pair of left and right front tightening portions and the pair of left and right rear tightening portions tighten the outer circumference of the inner column directly and without passing through the through-holes.

3. The steering apparatus according to claim 2, wherein an axial center position between the pair of left and right front tightening portions and the pair of left and right rear tightening portions and an axial center position of the telescopic slots are shifted from one another in the axial direction.

4. The steering apparatus according to claim 2, wherein the distance bracket is integrally formed in a U shape or in an inverted-U shape, and is attached around the outer circumference of the outer column.

5. The steering apparatus according to claim 2, wherein the distance bracket includes a left distance bracket having the left tightening portions and a right distance bracket having the right tightening portions, the left distance bracket and the right distance bracket being formed as separate components, and one end of each of the left distance bracket and the right distance bracket being fixed to the outer circumference of the outer column.

6. The steering apparatus according to claim 2, wherein the pair of left and right front tightening portions and the pair of left and right rear tightening portions tighten a lower side or an upper side of the outer circumference of the inner column.

7. The steering apparatus according to claim 2, wherein a front end portion of one of the inner column and the outer column is fixed to the vehicle body.

* * * * *